United States Patent
Allen et al.

(10) Patent No.: US 11,449,951 B1
(45) Date of Patent: Sep. 20, 2022

(54) INTELLIGENT SECURE AUTOMATION OF CLAIM PREEMPTIVE SUBROGATION

(71) Applicant: INTERNATIONAL BUSINESS MACHINES CORPORATION, Armonk, NY (US)

(72) Inventors: Ira L. Allen, Coppell, TX (US); Michael Jack Martine, Chapel Hill, NC (US); Stan Kevin Daley, Atlanta, GA (US); Mark Carter, Irvine, CA (US); Sarah Diane Green, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/302,978

(22) Filed: May 18, 2021

(51) Int. Cl.
*G06Q 40/08* (2012.01)
*G06N 5/04* (2006.01)
*G06F 16/27* (2019.01)
*G06F 21/62* (2013.01)

(52) U.S. Cl.
CPC ............ *G06Q 40/08* (2013.01); *G06F 16/27* (2019.01); *G06F 21/62* (2013.01); *G06N 5/043* (2013.01)

(58) Field of Classification Search
CPC .................................................. G06Q 40/08
See application file for complete search history.

(56) References Cited

U.S. PATENT DOCUMENTS

| 10,713,727 | B1 * | 7/2020 | Floyd .................... H04L 9/0637 |
| 10,832,337 | B1 | 11/2020 | Floyd |
| 10,872,381 | B1 | 12/2020 | Leise |
| 10,885,590 | B2 | 1/2021 | Sivakumar |
| 2009/0300065 | A1 | 12/2009 | Birchall |
| 2019/0303463 | A1 | 10/2019 | Catalano |

FOREIGN PATENT DOCUMENTS

| CN | 109508797 A | 3/2019 |
| CN | 109857750 A | 6/2019 |
| CN | 110084708 A | 8/2019 |

OTHER PUBLICATIONS

Fu, Hongliang et al.; Improved semi-supervised autoencoder for deception detection; PLos One; Oct. 8, 2019; 15 pages.
(Continued)

*Primary Examiner* — Edward Chang
(74) *Attorney, Agent, or Firm* — Schmeiser, Olsen & Watts; Christopher M. Pignato (57) ABSTRACT

An approach is provided for automatically performing claim preemptive subrogation. An intelligent agent in an artificial intelligence system is activated. An occurrence of a vehicular event is detected. Using the intelligent agent, a mesh network of devices positioned within an environment surrounding the vehicular event is established. Property, event, and environmental data describing the vehicular event is collected and stored in a blockchain node. A smart contract is established on the blockchain node. The smart contract provides authorized parties with an access to the stored property, event, and environmental data. Based on the stored property, event, and environmental data and rule(s), a preemptive subrogation is performed by determining a cause of the vehicular event.

20 Claims, 5 Drawing Sheets

(56) References Cited

OTHER PUBLICATIONS

Poesio, Massimo; Detecting deception in text using NLP methods; Signal; May 30, 2018; 54 pages.

Raikwar, Mayank, et al.; A Blockchain Framework for Insurance Processes; 2018 9th IFIP International Conference on New Technologies, Mobility and Security (NTMS); Feb. 26-28, 2018; 4 pages.

Anonymous; Vehicle black boxes that coordinate and pass data in a peer-to-peer method in the event of an accident; IP.com; IPDOM000171796D; Jun. 19, 2008; 2 pages.

\* cited by examiner

INTELLIGENT SECURE AUTOMATION OF CLAIM PREEMPTIVE SUBROGATION

BACKGROUND

The present invention relates to resolving insurance claims, and more particularly to providing intelligent and secure automation of claim preemptive subrogation.

In today's on-demand culture, consumers want quick, digital, and traceable resolution of insurance claims. Subrogation is a process by which a policyholder's insurance company has the right to substitute itself for its policyholder in order to recover expenses from another party, where the expenses are associated with the insurance company having reimbursed its policyholder under the terms of the insurance policy. With respect to a vehicular event (e.g., a motorized vehicle accident), an insurance company follows the subrogation process to recover costs (e.g., property damage costs and/or medical bills) associated with the vehicular event. The subrogation process includes determining who is at fault and if more than one party is at fault, the subrogation process may include determining a percentage of responsibility that each of the parties holds.

SUMMARY

In one embodiment, the present invention provides a computer-implemented method. The method includes activating, by one or more processors, an intelligent agent in an artificial intelligence (AI) system configured to detect an occurrence of a vehicular event and perform subrogation in accordance with one or more rules. The method further includes detecting, by the one or more processors and using the intelligent agent, an occurrence of the vehicular event. The method further includes in response to the detecting the occurrence of the vehicular event, establishing, by the one or more processors and using the intelligent agent, a mesh network of devices positioned within an environment surrounding the vehicular event. The method further includes collecting, by the one or more processors and using the intelligent agent and the mesh network, property data, event data, and environmental data associated with the vehicular event, wherein the property data includes descriptions of one or more vehicles involved in the vehicular event and descriptions of one or more operators of the one or more vehicles, wherein the event data includes information about events and observations associated with the vehicular event, and wherein the environmental data describes conditions in an area surrounding the vehicular event, the conditions being external to the one or more vehicles involved in the vehicular event. The collected property, event, and environmental data describes the occurrence of the vehicular event. The method further includes storing, by the one or more processors and using the intelligent agent, the property, event, and environmental data in a blockchain node and establishing a smart contract on the blockchain node. The smart contract provides authorized parties associated with the vehicular event with an access to the stored property, event, and environmental data. The method further includes based on (i) the stored property, event, and environmental data and (ii) the one or more rules, performing, by the one or more processors and using the intelligent agent, a preemptive subrogation by determining a cause of the vehicular event. As used herein, a processor is hardware within a computer that executes instructions in a computer program.

A computer program product and a computer system corresponding to the above-summarized method are also described and claimed herein.

DETAILED DESCRIPTION

Overview

The cost and complexity of known techniques for processing an insurance claim for a vehicular event have increased. Because the complexity in processing the insurance claim has increased the time for resolving the claim, customer satisfaction has decreased. Customer satisfaction may be decreased because current approaches to process insurance claims are not digital and traceable. Due to a declining interest in the insurance adjuster profession, it is difficult to increase the number of insurance adjusters to improve the timeliness, accuracy, and traceability of the resolution of insurance claims. Moreover, fraud may be an issue when an insurance company lacks some information about a vehicular event. As used herein, a vehicular event means an insurable event that involves one or more motorized vehicles (e.g., an accident or collision involving one or more motorized vehicles). As used herein, a motorized vehicle is a means of conveyance or transport that uses a motor or engine for propulsion. Motorized vehicles include, but are not limited to, road vehicles (e.g., automobiles, trucks, buses, etc.), rail transport vehicles (e.g., trains, trams, etc.), watercraft, amphibious vehicles, spacecraft, and aircraft, including uncrewed aerial vehicles (i.e., drones). Motorized vehicles include human-controlled vehicles, autonomous vehicles, and vehicles that are partly autonomous and partly human-controlled.

Embodiments of the present invention address the aforementioned unique challenges of processing an insurance claim regarding a vehicular event by providing an intelligent workflow and secure automation of claim preemptive subrogation using mesh networks. In one embodiment, the automated claim preemptive subrogation uses a software-based intelligent agent in an artificial intelligence (AI) system to subrogate and settle a claim at the site of the vehicular event using information and digital facts gathered in the mesh network and stored in a blockchain. In one embodiment, the automated claim preemptive subrogation provides a limited-bias evaluation of a vehicular event (e.g., motorized vehicle accident or collision) using a plurality of devices and exogenous data and media from multiple sources (e.g., photos and video), which reassembles what happened in the vehicular event. The aforementioned intelligent workflow decreases costs, provides better business outcomes, and proves results in a manner that is more accurate and provable than traditional manual approaches. Furthermore, the intelligent workflow and secure automation of claim preemptive subrogation is provided without requiring an increase in the number of insurance adjusters. Moreover, the intelligent and secure automation of claim preemptive subrogation discourages fraud because consumers know that the insurance company has a significant amount of information about the vehicular event.

In one embodiment, a system providing an intelligent, secure, and automated claim preemptive subrogation evaluates a range of inputs to assess potential fault, generate a subrogation recommendation aligned with local policies and practices, and perform blockchain payouts of settlements using conditional smart contracts.

In one embodiment, the automated claim preemptive subrogation system uses a prescriptive method to gather event-associated information from a variety of exogenous digital and data sources associated with the moving object collision, including but not limited to digital and data sources from inside and outside the moving object. In one embodiment, the aforementioned event-associated information is stored as non-repudiated data using blockchain technology on a secure cloud.

In one embodiment, the automated claim preemptive subrogation system performs the following actions: (1) at the scene of the vehicular event, (i) detect the vehicular event, (ii) capture data associated with the vehicular event, (iii) use a plurality of mesh and fog networks, and (iv) collect data from devices across the networks; (2) connect to a single blockchain network (i.e., cloud, on-premises, or on-device), (3) initiate a cloud-based, intelligent preemptive subrogation agent; (4) de-bias the preemptive subrogation agent, and (5) perform a blockchain transfer of a settlement related to the vehicular event.

In one or more embodiments, the intelligent, secure, and automated claim preemptive subrogation system may be applied in the insurance industry (i.e., any industry that performs subrogation of risk of collision among moving objects; e.g., supply chain, fleet, self-insured industries, etc.) and in vehicle manufacturing (i.e., manufacturing motorized vehicles that have the capability to employ the claim preemptive subrogation system).

System for Claim Preemptive Subrogation

Figure 1:
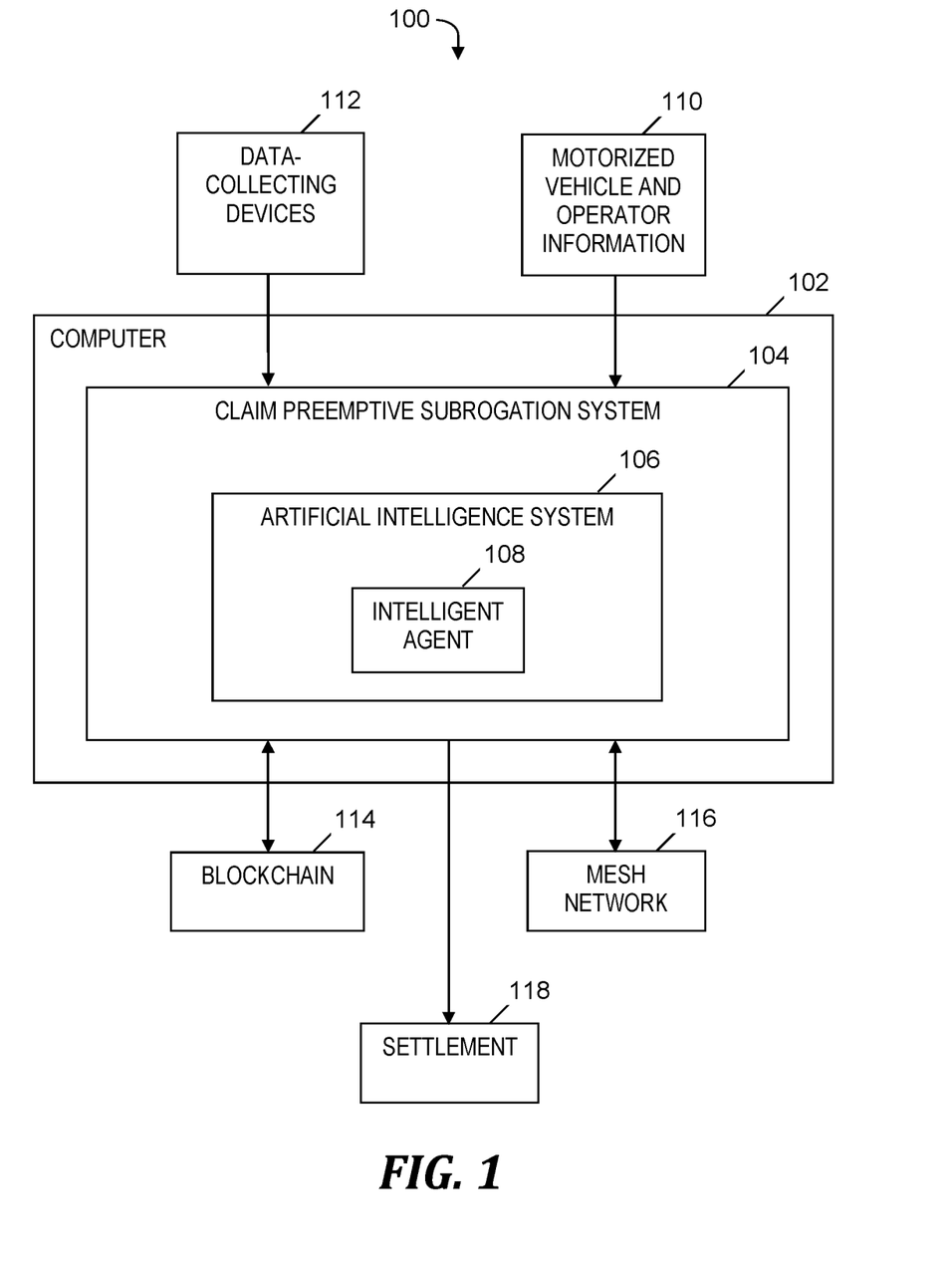
FIG. 1 is a block diagram of a system for intelligent, secure, and automated claim preemptive subrogation, in accordance with embodiments of the present invention.

FIG. 1 is a block diagram of a system 100 for intelligent, secure, and automated claim preemptive subrogation, in accordance with embodiments of the present invention. System 100 includes a computer 102 that includes a software-based claim preemptive subrogation system 104, which includes an artificial intelligence (AI) system 106 that is configured to detect an occurrence of a vehicular event and perform insurance claim processing preemptive subrogation that is intelligent, secure, and automated. Insurance claim processing preemptive subrogation is also referred to herein as claim preemptive subrogation. Claim preemptive subrogation system 104 activates a software-based intelligent agent 108 to provide the claim preemptive subrogation.

Claim preemptive subrogation system 104 retrieves data from motorized vehicle and operator information 110, which includes descriptions of the motorized vehicle(s) and descriptions of the operator(s) of the motorized vehicle(s). In one embodiment, motorized vehicle and operator information 110 includes public records about motorized vehicles and operators of the motorized vehicles. Claim preemptive subrogation system 104 also receives or captures data from data-collecting devices 112, which include, but are not limited to, device(s) that are inside or outside the motorized vehicle(s) involved in the vehicular event and are operatively coupled to the motorized vehicle(s) and device(s) that are not coupled to a motorized vehicle, but are located in an environment surrounding the vehicular event. Based on the data received from motorized vehicle and operator information 110 and data-collecting devices 112, claim preemptive subrogation system 104 detects an occurrence of a vehicular event and stores the received data in a node of a blockchain 114.

Claim preemptive subrogation system 104 establishes a mesh network 116 of devices positioned in a surrounding environment of the vehicular event. The surrounding environment is defined as being within a defined distance from the location of the vehicular event. In one embodiment, mesh network 116 includes at least one of the following networks: wireless network, ad hoc network, peer to peer network, video monitoring network, coaxial network, and cloud network. In one embodiment, the devices in mesh network 116 include one or more of the data-collecting devices 112.

Claim preemptive subrogation system 104 collects data from the devices in mesh network 116, where the collected data describes and/or depicts the occurrence of the vehicular event. Claim preemptive subrogation system 104 stores the collected data in a node in blockchain 114 and generates a smart contract on blockchain 114 that makes the collected data available to authorized parties associated with the vehicular event.

Based on the data stored in blockchain 114 and one or more business rules and/or business policies, claim preemptive subrogation system 104 performs a preemptive subrogation process, which determines a cause of the vehicular event. Claim preemptive subrogation system 104 also performs heuristic subrogation by determining local insurance regulation(s) associated with attributes of the vehicular event, comparing data items among the aforementioned collected data, assessing the party or parties at fault for causing the vehicular event, assessing any conflicting rules or policies associated with the motorized vehicle(s) involved in the vehicular event, determining whether there is a dispute or non-agreement regarding the fault determination or the assessments of the rules and/or policies. If there is a dispute or non-agreement, the heuristic subrogation includes collecting additional data from motorized vehicle(s) in a surrounding environment in proximity to the vehicular event. As used herein, a local insurance regulation is an insurance regulation that applies to a particular locality (e.g., a state) in which the vehicular event occurs.

Based on the collected data, claim preemptive subrogation system 104 rendering a decision that determines fault and resolves any dispute or non-agreement. Based on the rendered decision, claim preemptive subrogation system 104 determines a settlement 118 for the vehicular event. Claim preemptive subrogation system 104 generates a transparent explanation of how the aforementioned decision was determined.

Claim preemptive subrogation system 104 transfers settlement 118 from the node in blockchain 114 to computer system(s) of one or more entities who are tasked with fulfilling the settlement for an insurance claim for the vehicular event. The transfer of settlement 118 is based on the aforementioned rendered decision and prevailing regulations and business policies and practices.

In one embodiment, claim preemptive subrogation system 104 uses machine learning algorithms, actuarial tables, and data from Global Positioning System (GPS) receivers (not shown) to refine optimal next actions based on a risk model for insurance.

In one embodiment, claim preemptive subrogation system 104 uses natural language generation (NLG) technology (not shown) to assemble structured unbiased information that is recursively restructured and validated against known exogenous data for a rating of quality and imputed bias.

In one embodiment, claim preemptive subrogation system 104 dynamically derives a series of next-best actions using AI patterns with process automation software to conditionally trigger a plurality of actions required to achieve optimal business outcomes.

In one embodiment, claim preemptive subrogation system 104 (1) ingests exogenous data from a plurality of non-repudiated sources that is matched to related records from a motorized vehicle or motorized vehicle-connected device, where the related records include derived driving behavior records, and (2) uses the ingested exogenous data to calculate a net present value of a motorized vehicle involved in a collision, and determine a next-best interaction for the driver of the motorized vehicle at the time of the collision.

In one embodiment, claim preemptive subrogation system 104 uses digital twin technology to enable motorized vehicle visualization of current conditions, aggregation of accident information, and performance as a proxy for the parties involved in the accident across the damage claim process.

The functionality of the components shown in FIG. 1 is described in more detail in the discussion of FIGS. 2A-2B, FIG. 3, and FIG. 4 presented below.

Process for Claim Preemptive Subrogation

Figure 2A:
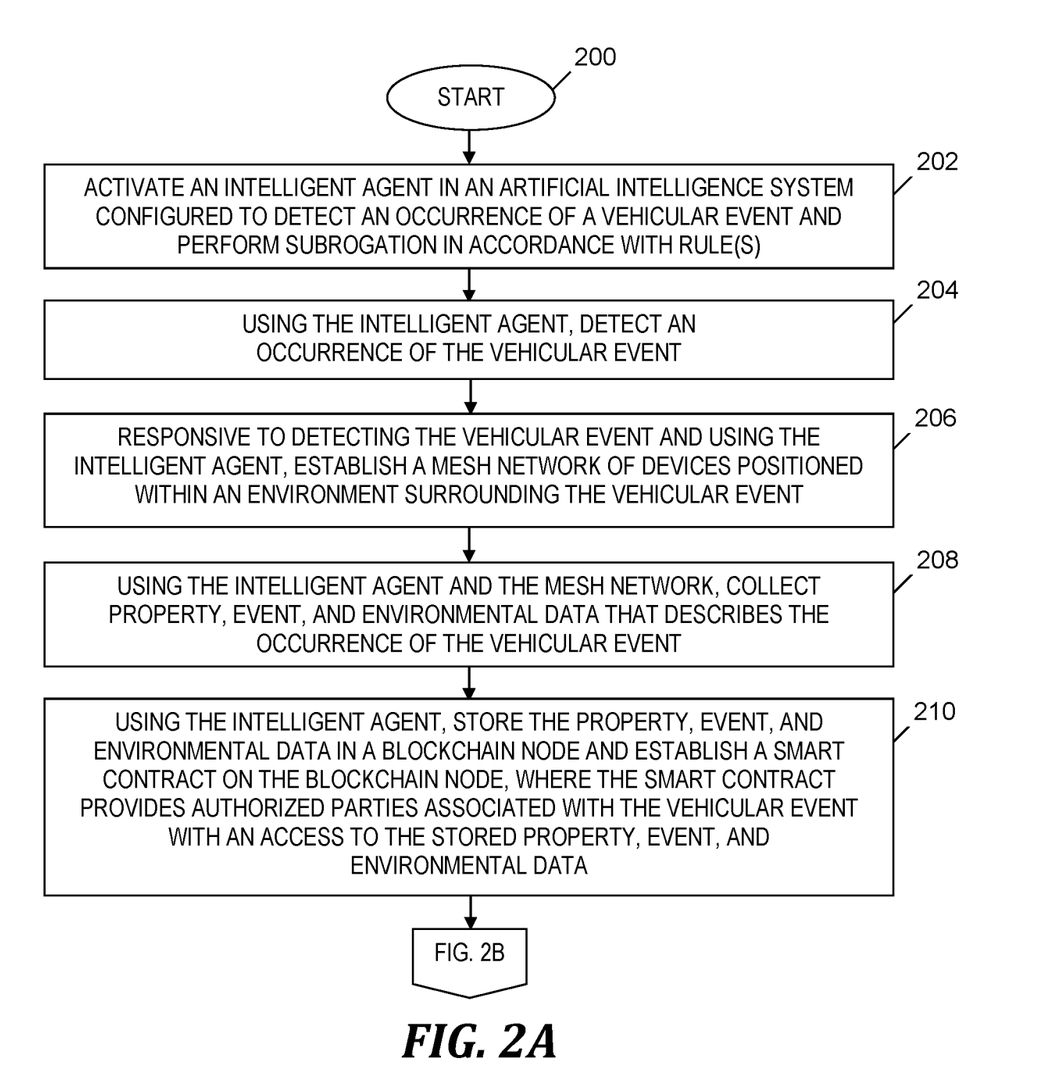
FIGS. 2A-2B depict a flowchart of a process of intelligent, secure, and automated claim preemptive subrogation, where the process is implemented in the system of FIG. 1, in accordance with embodiments of the present invention.
Figure 2B:
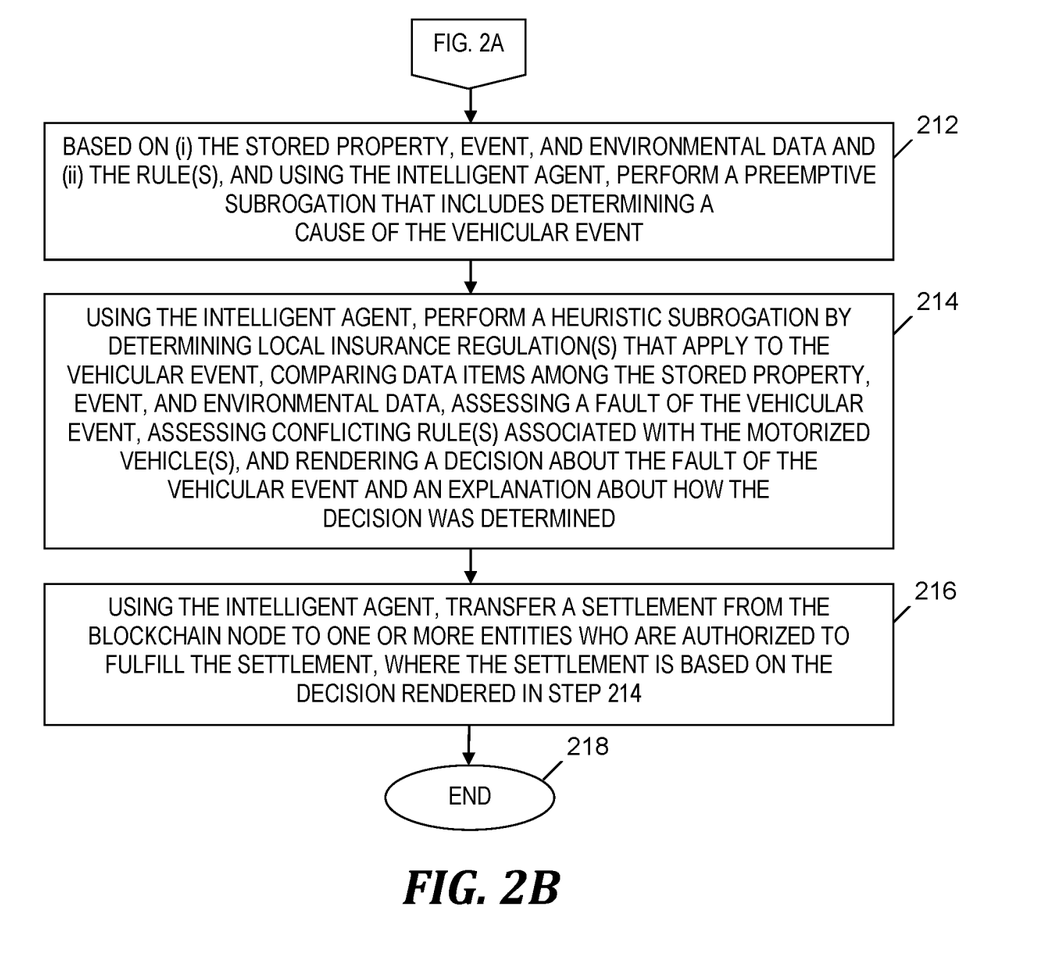

FIGS. 2A-2B depict a flowchart of a process of intelligent, secure, and automated claim preemptive subrogation, where the process is implemented in the system of FIG. 1, in accordance with embodiments of the present invention. The process of FIGS. 2A-2B begins at a start node 200 in FIG. 2A. In step 202, claim preemptive subrogation system 104 (see FIG. 1) activates intelligent agent 108 (see FIG. 1).

In step 204, using intelligent agent 108 (see FIG. 1), claim preemptive subrogation system 104 (see FIG. 1) detects an occurrence of a vehicular event (e.g., detects a motorized vehicle accident). In one embodiment, detecting the occurrence of the vehicular event in step 204 includes, but is not limited to, (1) capturing who or what was controlling the actions of motorized vehicle(s) involved in the vehicular event, (2) determining a location at which the vehicular event took place (e.g., by retrieving information from a GPS receiver in a motorized vehicle involved in the vehicular event), (3) determining the local insurance regulation(s) that apply based on the location of the vehicular event, and/or (4) accessing public records about the operator of a motorized vehicle involved in the vehicular event and sending a notification about a need to access historical data regarding the operator or the motorized vehicle.

In one embodiment, step 204 includes claim preemptive subrogation system 104 (see FIG. 1) using intelligent agent 108 (see FIG. 1) to capture and analyze data from one or more of data-collecting devices 112 (see FIG. 1), which are in or on a motorized vehicle involved in the vehicular event. The device(s) from which data is captured in step 204 can include, but are not limited to, an accelerometer, a gyroscope, a black box, and a camera. In one embodiment, claim preemptive subrogation system 104 (see FIG. 1) stores the data captured in step 204 in a node in blockchain 114 (see FIG. 1), In step 206, responsive to the detection of the vehicular event in step 204 and using intelligent agent 108 (see FIG. 1), claim preemptive subrogation system 104 (see FIG. 1) establishes mesh network 116 (see FIG. 1) of devices positioned within an environment surrounding the vehicular event. In one embodiment, the environment is defined as the locations within a variable radius from the vehicular event. AI system 106 (see FIG. 1) determines the aforementioned radius based on the number of sources and the quality of the data. In one embodiment, AI system 106 (see FIG. 1) starts at the location of the vehicular event and moves out from the vehicular event until AI system 106 (see FIG. 1) has enough exculpatory data.

In one embodiment, the mesh network 116 (see FIG. 1) established in step 206 is comprised of a variety of networks, which can include, but are not limited to, wireless network(s), ad hoc network(s), peer to peer network(s), video monitoring network(s), coaxial network(s), and/or cloud network(s).

Although the process of FIGS. 2A-2B describes utilizing mesh network 116 (see FIG. 1), other embodiments of the present invention include utilizing a fog network instead of or in addition to the mesh network 116 (see FIG. 1).

In step 208, using intelligent agent 108 (see FIG. 1), claim preemptive subrogation system 104 (see FIG. 1) collects property, event, and environmental data that describes the occurrence of the vehicular event. In one embodiment, intelligent agent 108 (see FIG. 1) collects at least some of the property, event, and environmental data from the devices in mesh network 116 (see FIG. 1). The property, event, and environmental data collected by claim preemptive subrogation system 104 (see FIG. 1) in step 208 can be streamed, stored, local, or persistent. In one embodiment, intelligent agent 108 (see FIG. 1) collects the property, event, and environmental data from one or more devices or items in the environment surrounding the vehicular event, which can include, but are not limited to, a device in a motorized vehicle involved in the vehicular event, a traffic camera, a security camera, a license plate, a device in a motorized vehicle operated by a witness to the vehicular event, an embedded road sensor, and a pedestrian point of interest (POI).

The property data collected in step 208 includes descriptions of the vehicle(s) involved in the vehicular event and descriptions of the operator(s) of the vehicle(s). For example, the property data can include the type of motorized vehicle involved in the vehicular event and information from the license plate of the motorized vehicle.

The event data collected in step 208 includes information about events and observations associated with the vehicular event, including events and observations that occur at times that are before, during, and after the time period in which the vehicular event occurs (e.g., video collected from a security camera that includes images captured starting at five minutes before the occurrence of the vehicular event, images captured during the vehicular event, and images captured up to five minutes after the vehicular event). For example, the event data can include data from embedded road sensors, monitoring devices in or on a motorized vehicle operated by a witness to the vehicular event, traffic cameras, security cameras, etc., which are included in the data-collecting devices 112 (see FIG. 1), which are located within an environment surrounding the vehicular event.

The environmental data describes conditions within an environment surrounding the vehicular event. The conditions described by the environmental data are external to the vehicle(s) involved in the vehicular event. For example, the environmental data includes a description of weather conditions, visibility, and road conditions in the environment surrounding the vehicular event.

In one embodiment, steps 204 and 208 include dynamically capturing data from exogenous sources and observational witness data.

In step 210, using intelligent agent 108 (see FIG. 1), claim preemptive subrogation system 104 (see FIG. 1) stores the data collected in step 208 in a node in blockchain 114 (see FIG. 1), thereby moving the localized data to a blockchain node, providing a canonical source of unbiased data, and capturing relevant data from before, during, and after the vehicular event. Step 210 includes intelligent agent 108 (see FIG. 1) copying data from local storage to the node in blockchain 114 (see FIG. 1), thereby persisting the data for as long as is necessary to complete the claim preemptive subrogation process and avoiding difficulties with certain data being temporal (e.g., streaming video that is normally overwritten in local storage). The storage in step 210 facilitates a quick collection of data relevant to the claim preemptive subrogation before the data is overwritten. In one embodiment, claim preemptive subrogation system 104 (see FIG. 1) in step 210 stores only the data that is needed to complete the insurance claim processing subrogation.

Furthermore, step 210 includes claim preemptive subrogation system 104 (see FIG. 1) establishing a smart contract on the node in blockchain 114 (see FIG. 1), which centralizes the blockchain data. The smart contract provides authorized parties associated with the vehicular event with an access to the property, event, and environmental data stored in the node in blockchain 114 (see FIG. 1), for purposes stipulated in the smart contract. The smart contract specifies who is authorized to access particular data items, and for what purpose (e.g., how much data can be accessed and how long does a person have to store the data). For example, the smart contract specifies that an opposing counsel cannot access certain data until a party files a claim and initiates a lawsuit.

In one embodiment, step 210 includes claim preemptive subrogation system 104 (see FIG. 1) connecting to a single blockchain network (i.e., cloud, on-premises, or on-device).

After step 210, the process of FIGS. 2A-2B continues with step 212 in FIG. 2B.

In step 212, based on (i) the stored property, event, and environmental data and (ii) the rule(s) (e.g., business rules) according to which subrogation is configured to be performed by AI system 106 (see FIG. 1), and using intelligent agent 108, claim preemptive subrogation system 104 (see FIG. 1) performs a preemptive subrogation that includes determining a cause of the vehicular event prior to assigning fault to one or more parties associated with the vehicular event.

In one embodiment, step 212 is a parallel process to the detection of the vehicular event and the establishment of the mesh network 116 (see FIG. 1) in steps 204 and 206.

In step 214, using intelligent agent 108 (see FIG. 1), claim preemptive subrogation system 104 (see FIG. 1) performs a heuristic subrogation by determining local insurance regulation(s) that apply to the vehicular event, comparing data items among the stored property, event, and environmental data, assessing what party or parties are at fault for causing the vehicular event, determining whether there are any conflicting rules and/or policies associated with the motorized vehicle(s) involved in the vehicular event, assessing the conflicting rule(s), and identifying a dispute or non-agreement about the fault determination or the assessment of the conflicting rules and/or policies.

If there is an identification of the aforementioned dispute or non-agreement, claim preemptive subrogation system 104 (see FIG. 1) securely collects additional data from motorized vehicle(s) in a surrounding environment in proximity to the vehicular event. Based on the collected data, claim preemptive subrogation system 104 (see FIG. 1) renders a decision that determines fault and resolves the dispute or non-agreement and generates an explanation of how the decision was determined.

In one embodiment, subsequent to the identification of the dispute or non-agreement, the claim preemptive subrogation system 104 (see FIG. 1) generates a recommendation for an issuance of one or more subpoenas for a collection of the additional data from the motorized vehicle(s) in the surrounding environment in proximity to the location of the vehicular event. In response to the issuance of the one or more subpoenas, claim preemptive subrogation system 104 (see FIG. 1) securely collects the additional data from the motorized vehicle(s) in the surrounding environment in proximity to the location of the vehicular event. Based on the additional data collected from the motorized vehicle in the surrounding environment in proximity to the location of the vehicular event, claim preemptive subrogation system 104 (see FIG. 1) renders a new decision that resolves the dispute or non-agreement.

In one embodiment, step 214 includes claim preemptive subrogation system 104 (see FIG. 1) employing an unbiased preemptive subrogation agent which performs the aforementioned heuristic subrogation.

In one embodiment, the preemptive subrogation and heuristic subrogation performed in steps 212 and 214 is performed prior to a receipt of a first notice of loss for the vehicular event.

In step 216, using intelligent agent 108 (see FIG. 1), claim preemptive subrogation system 104 (see FIG. 1) transfers settlement 118 (see FIG. 1) from the node in blockchain 114 (see FIG. 1) to computer system(s) of one or more entities who are authorized to fulfill the settlement. The settlement 118 (see FIG. 1) is based on the decision rendered in step 214. In one embodiment, intelligent agent 108 (see FIG. 1) engages a risk system to provide the settlement 118 (see FIG. 1) to settle the claim associated with the vehicular event based on prevailing regulations and business policies and practices. In one embodiment, steps 204, 206, 208, 210, 212, 214, and 216 are performed by intelligent agent 108 (see FIG. 1).

The process of FIGS. 2A-2B ends at an end node 218.

Example

Figure 3:
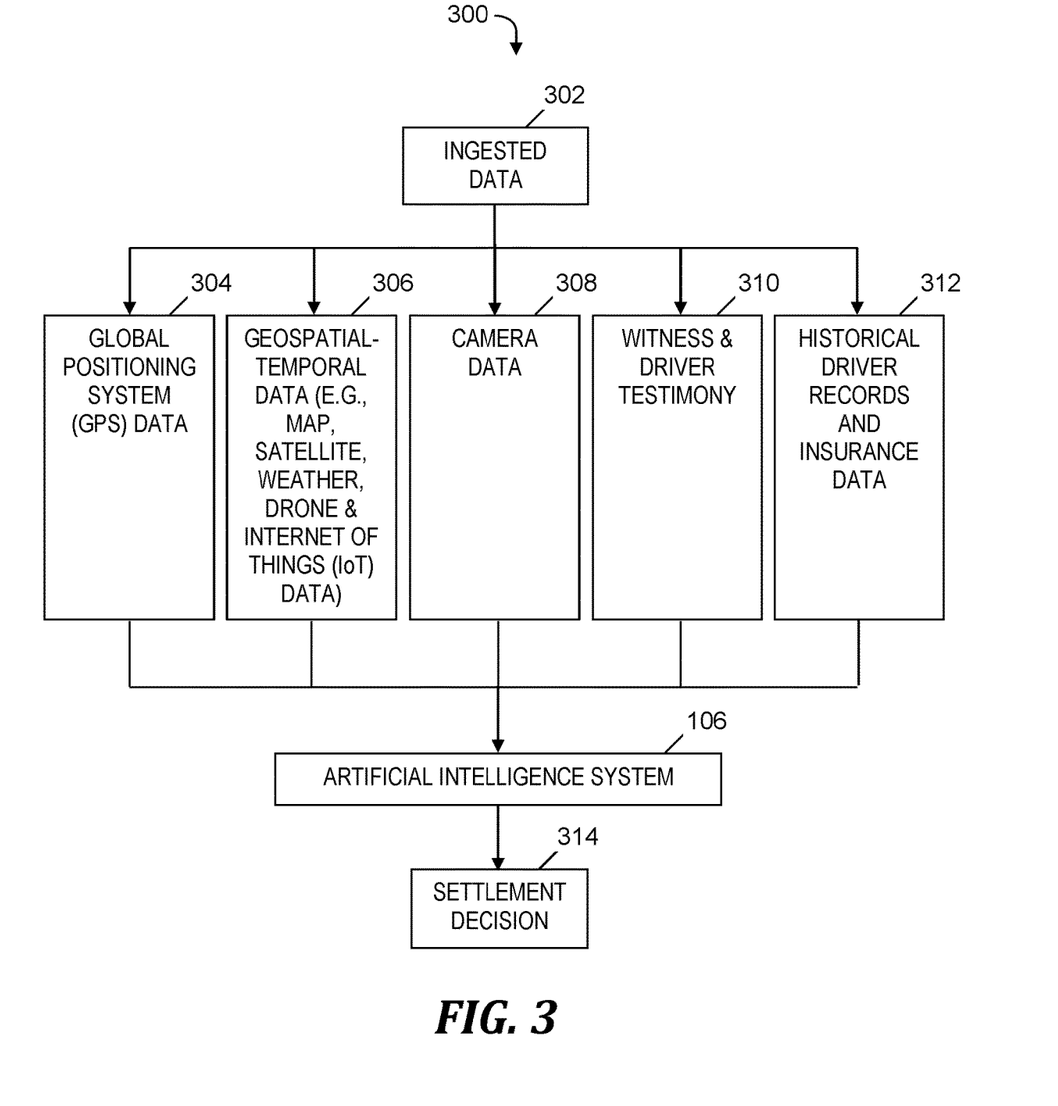
FIG. 3 is an example of an AI system processing ingested data for claim preemptive subrogation included in the process of FIGS. 2A-2B, where the AI system is included in the system of FIG. 1, in accordance with embodiments of the present invention.

FIG. 3 is an example 300 of AI system 106 processing ingested data for claim preemptive subrogation included in the process of FIGS. 2A-2B, in accordance with embodiments of the present invention. Ingested data 302 includes, for example, GPS data 304, geospatial-temporal data 306 (e.g., map, satellite, weather, drone, and Internet of Things (IoT) data), camera data 308, witness and driver testimony 310, and historical driver records and insurance data 312. The types of data depicted in example 300 are merely an example. Example 300 may be modified so that ingested data 302 includes any combination of the types of data depicted in FIG. 3 and/or one or more other types of data not depicted in FIG. 3.

In example 300, AI system 106 determines a geolocation of a vehicular event and associated risk factors (e.g., visibility, weather conditions, and road conditions) based on GPS data 304 and geospatial-temporal data 306. AI system 106 predicts the type of accident, a risk class, traffic congestion, and/or a severity of the accident associated with the vehicular event. For instance, a neural network included in AI system 106 can ingest the features from GPS data 304 and geospatial-temporal data 306 and activate a softmax function to generate a prediction of the type of accident involved in the vehicular event and a risk class (e.g., high, medium, or low risk class) for the vehicular event. As another example, AI system 106 integrates GPS data 304 within a recurrent neural network (RNN) to determine traffic congestion at the time of the vehicular event. AI system 106 combines the determination of traffic congestion with data about the vehicular event to forecast a severity of the vehicular event. AI system 106 uses the severity of the vehicular event as a basis for generating a settlement decision 310.

Furthermore, AI system 106 uses the aforementioned features together with other data points to validate the accuracy of witness and driver testimony 310 (i.e., testimony about the vehicular event).

In a case in which GPS data 304 is not fully available, AI system 106 uses geospatial-temporal data 306 as a basis for a determination of the geolocation of the vehicular event. AI system 106 can also collect chat information from individuals using a chat application in an area proximate to the vehicular event and determine the geolocation of the vehicular event based on the collected chat information.

In example 300, camera data 308 includes video and/or images from cameras associated with the vehicular event (e.g., cameras in or on vehicle(s) involved in the vehicular event and cameras in the environment surrounding the vehicular event). The cameras may include, for example, traffic cameras and cameras on autonomous vehicles. AI system 106 uses camera data 308 to generate insights that facilitate a validation of attributes of the vehicular event. The attributes that are validated may include, but are not limited to, geolocation of the vehicular event, time of the vehicular event, conditions (e.g., weather conditions) in the environment surrounding the vehicular event, lightings associated with the vehicular event, and the one or more parties at fault for the vehicular event. Furthermore, AI system 106 can use camera data 308 to classify a type of the vehicular event or validate the accuracy of witness and driver testimony 310.

For instance, AI system 106 uses the scale-invariant feature transform (SIFT) algorithm to detect and describe local visual features in the digital images in camera data 308, locate key points that are robust to changes in scale, orientation, shear, position, and illumination, and compute respective descriptors (i.e., quantitative information) for the key points. In the case of the camera data 308 being obtained from a camera on an autonomous vehicle that is involved in the vehicular event, AI system 106 detects visual features using SIFT and uses the visual features to compute impact energy, direction, location, etc. associated with the vehicular event.

In example 300, AI system 106 employs a deception detection technique to validate the accuracy of witness and driver testimony 310, check facts about the vehicular event, and test for false insurance claims. For instance, AI system 106 classifies a testimony in witness and driver testimony 310 a being deceptive by using a natural language processing (NLP)-based deception detection technique that uses the Linguistic Inquiry and Word Count (LIWC) corpus or a trained network of proven false claims and lies. As another example, AI system 106 may classify the testimony using a semi-supervised additive noise autoencoder model for deception detection.

In example 300, historical driver records and insurance data 312 includes, for example, descriptions of past traffic violations, accidents, and (human or autonomous) driver behavior. AI system 106 uses historical driver records and insurance data 312 to predict if a party involved in the vehicular event is in favor of accepting the settlement decision 314. For instance, AI system 106 uses the descriptions of past traffic violations, accidents, and driver behavior to train and generate a confidence score (e.g., a score in the range [0, 100]) that indicates a likelihood of the party favoring the settlement decision 314. Alternately, AI system 106 can match a new vehicle operator with a confidence class. AI system 106 can obtain the confidence score, for example, via a regressor or a linear neural network.

Computer System

Figure 4:
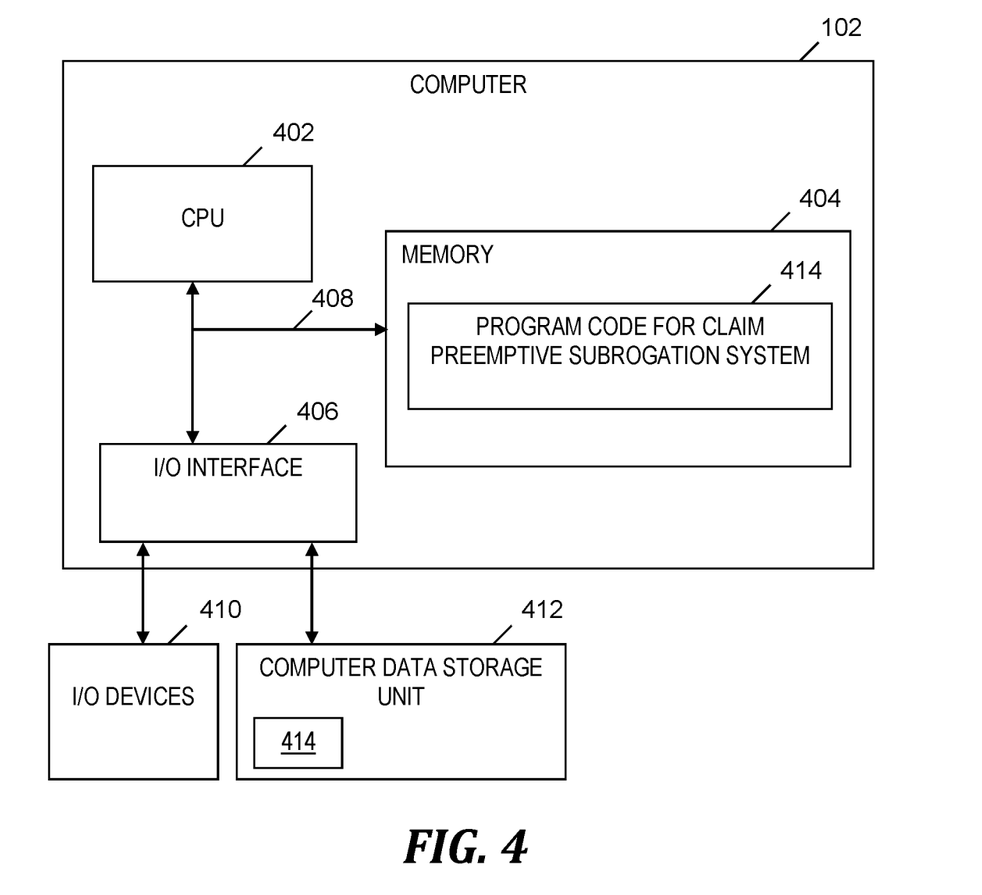
FIG. 4 is a block diagram of a computer that is included in the system of FIG. 1 and that implements the process of FIGS. 2A-2B, in accordance with embodiments of the present invention.

FIG. 4 is a block diagram of a computer that is included in the system of FIG. 1 and that implements the process of FIGS. 2A-2B, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for claim preemptive subrogation system 104 (see FIG. 1) to perform a method of performing intelligent, secure, and automated claim preemptive subrogation, where the instructions are executed by CPU 402 via memory 404. CPU 402 may include a single processing unit or processor or be distributed across one or more processing units or one or more processors in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems or a plurality of computer readable storage media in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes one or more known computer readable storage media, where a computer readable storage medium is described below. In one embodiment, computer data storage unit 412 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to perform intelligent, secure, and automated claim preemptive subrogation. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4. Blockchain 114 (see FIG. 1) may be included in computer data storage unit 412.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to performing intelligent, secure, and automated claim preemptive subrogation. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to perform intelligent, secure, and automated claim preemptive subrogation. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of performing intelligent, secure, and automated claim preemptive subrogation.

While it is understood that program code 414 for performing intelligent, secure, and automated claim preemptive subrogation may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of performing intelligent, secure, and automated claim preemptive subrogation. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising:
a central processing unit (CPU);
a memory coupled to the CPU; and
one or more computer readable storage media coupled to the CPU, the one or more computer readable storage media collectively containing instructions that are executed by the CPU via the memory to implement a method of automatically performing claim preemptive subrogation, the method comprising:
the computer system activating an intelligent agent in an artificial intelligence (AI) system configured to detect an occurrence of a vehicular event and perform subrogation in accordance with one or more rules;
the computer system detecting, by using the intelligent agent, an occurrence of the vehicular event;
in response to the detecting the occurrence of the vehicular event, the computer system establishing, by using the intelligent agent, a mesh network of devices positioned within an environment surrounding the vehicular event, wherein the mesh network of devices includes a first camera monitoring traffic in the environment and a second camera on an autonomous vehicle involved in the vehicular event;
the computer system determining traffic congestion at a time of the vehicular event by integrating data from a Global Positioning System receiver in the autonomous vehicle with a recurrent neural network;
the computer system forecasting a severity of the vehicular event based on the traffic congestion;
using digital images from the first camera, the computer system determining a geolocation of the vehicular event and weather conditions in the environment;
the computer system determining impact energy associated with the vehicular event by using visual features of data from the second camera, the visual features being detected by an artificial intelligence system using a scale-invariant feature transform algorithm;

the computer system validating an accuracy of a testimony of a witness associated with the vehicular event by classifying the testimony by using a semi-supervised additive noise autoencoder model for deception detection, using the digital images from the first camera, and using the data from the second camera;

the computer system generating a confidence score indicating a likelihood of a party favoring a settlement decision associated with the vehicular event, the confidence score being based on historical traffic violations and historical accidents;

the computer system collecting, by using the intelligent agent and the mesh network, property data, event data, and environmental data associated with the vehicular event, wherein the property data includes descriptions of one or more vehicles involved in the vehicular event and descriptions of one or more operators of the one or more vehicles, wherein the event data includes information about events and observations associated with the vehicular event, and wherein the environmental data describes conditions in an area surrounding the vehicular event, the conditions being external to the one or more vehicles involved in the vehicular event;

the computer system storing, by using the intelligent agent, the property, event, and environmental data in a blockchain node and establishing a smart contract on the blockchain node, the smart contract providing authorized parties associated with the vehicular event with an access to the stored property, event, and environmental data;

based on (i) the stored property, event, and environmental data and (ii) the one or more rules, the computer system performing, by using the intelligent agent, a preemptive subrogation by determining a cause of the vehicular event; and based on the severity and geolocation of the vehicular event, the weather conditions of the environment surrounding the vehicular event, the impact energy associated with the vehicular event, the validated accuracy of the testimony, and the confidence score, the computer system triggering a generation of a settlement for an insurance claim for the vehicular event and transferring the settlement from the blockchain node to one or more computer systems of one or more entities who are tasked with fulfilling the settlement for the insurance claim for the vehicular event.

2. The computer system of claim 1, wherein the method further comprises the computer system performing, by using the intelligent agent, heuristic subrogation by determining one or more local insurance regulations that apply to the vehicular event, comparing data items among the stored property, event, and environmental data, assessing a fault of the vehicular event, assessing one or more conflicting rules associated with the one or more motorized vehicles involved in the vehicular event, and rendering a decision about the fault of the vehicular event and an explanation about how the decision was determined.

3. The computer system of claim 2, wherein the transferring the settlement is based on the decision about the fault of the vehicular event, one or more regulations, and one or more business policies.

4. The computer system of claim 2, wherein the method further comprises:

the computer system identifying a dispute about the decision about the fault of the vehicular event;

in response to the identifying the dispute, the computer system generating a recommendation for an issuance of one or more subpoenas for a collection of data from a motorized vehicle in proximity to a location of the vehicular event;

in response to the issuance of the one or more subpoenas, the computer system securely collecting the data from the motorized vehicle in proximity to the location of the vehicular event; and based on the data collected from the motorized vehicle in proximity to the location of the vehicular event, the computer system rendering a new decision that resolves the dispute.

5. The computer system of claim 2, wherein the method further comprises the computer system employing an unbiased preemptive subrogation agent, wherein the performing the heuristic subrogation is included in the employing the unbiased preemptive subrogation agent.

6. The computer system of claim 1, wherein the performing the preemptive subrogation is performed prior to a receipt of a first notice of loss for the vehicular event.

7. A computer program product for automatically performing claim preemptive subrogation, the computer program product comprising:

one or more computer readable storage media having computer readable program code collectively stored on the one or more computer readable storage media, the computer readable program code being executed by a central processing unit (CPU) of a computer system to cause the computer system to perform a method comprising:

the computer system activating an intelligent agent in an artificial intelligence (AI) system configured to detect an occurrence of a vehicular event and perform subrogation in accordance with one or more rules;

the computer system detecting, by using the intelligent agent, an occurrence of the vehicular event;

in response to the detecting the occurrence of the vehicular event, the computer system establishing, by using the intelligent agent, a mesh network of devices positioned within an environment surrounding the vehicular event, wherein the mesh network of devices includes a first camera monitoring traffic in the environment and a second camera on an autonomous vehicle involved in the vehicular event;

the computer system determining traffic congestion at a time of the vehicular event by integrating data from a Global Positioning System receiver in the autonomous vehicle with a recurrent neural network;

the computer system forecasting a severity of the vehicular event based on the traffic congestion;

using digital images from the first camera, the computer system determining a geolocation of the vehicular event and weather conditions in the environment;

the computer system determining impact energy associated with the vehicular event by using visual features of data from the second camera, the visual features being detected by an artificial intelligence system using a scale-invariant feature transform algorithm;

the computer system validating an accuracy of a testimony of a witness associated with the vehicular event by classifying the testimony by using a semi-supervised additive noise autoencoder model for deception detection, using the digital images from the first camera, and using the data from the second camera;

the computer system generating a confidence score indicating a likelihood of a party favoring a settlement decision associated with the vehicular event, the confidence score being based on historical traffic violations and historical accidents;

the computer system collecting, by using the intelligent agent and the mesh network, property data, event data, and environmental data associated with the vehicular event, wherein the property data includes descriptions of one or more vehicles involved in the vehicular event and descriptions of one or more operators of the one or more vehicles, wherein the event data includes information about events and observations associated with the vehicular event, and wherein the environmental data describes conditions in an area surrounding the vehicular event, the conditions being external to the one or more vehicles involved in the vehicular event;

the computer system storing, by using the intelligent agent, the property, event, and environmental data in a blockchain node and establishing a smart contract on the blockchain node, the smart contract providing authorized parties associated with the vehicular event with an access to the stored property, event, and environmental data;

based on (i) the stored property, event, and environmental data and (ii) the one or more rules, the computer system performing, by using the intelligent agent, a preemptive subrogation by determining a cause of the vehicular event; and based on the severity and geolocation of the vehicular event, the weather conditions of the environment surrounding the vehicular event, the impact energy associated with the vehicular event, the validated accuracy of the testimony, and the confidence score, the computer system triggering a generation of a settlement for an insurance claim for the vehicular event and transferring the settlement from the blockchain node to one or more computer systems of one or more entities who are tasked with fulfilling the settlement for the insurance claim for the vehicular event.

8. The computer program product of claim 7, wherein the method further comprises the computer system performing, by using the intelligent agent, heuristic subrogation by determining one or more local insurance regulations that apply to the vehicular event, comparing data items among the stored property, event, and environmental data, assessing a fault of the vehicular event, assessing one or more conflicting rules associated with the one or more motorized vehicles involved in the vehicular event, and rendering a decision about the fault of the vehicular event and an explanation about how the decision was determined.

9. The computer program product of claim 8, wherein the transferring the settlement is based on the decision about the fault of the vehicular event, one or more regulations, and one or more business policies.

10. The computer program product of claim 8, wherein the method further comprises:

the computer system identifying a dispute about the decision about the fault of the vehicular event;

in response to the identifying the dispute, the computer system generating a recommendation for an issuance of one or more subpoenas for a collection of data from a motorized vehicle in proximity to a location of the vehicular event;

in response to the issuance of the one or more subpoenas, the computer system securely collecting the data from the motorized vehicle in proximity to the location of the vehicular event; and based on the data collected from the motorized vehicle in proximity to the location of the vehicular event, the computer system rendering a new decision that resolves the dispute.

11. The computer program product of claim 8, wherein the method further comprises the computer system employing an unbiased preemptive subrogation agent, wherein the performing the heuristic subrogation is included in the employing the unbiased preemptive subrogation agent.

12. The computer program product of claim 7, wherein the performing the preemptive subrogation is performed prior to a receipt of a first notice of loss for the vehicular event.

13. A computer-implemented method comprising:

activating, by one or more processors, an intelligent agent in an artificial intelligence (AI) system configured to detect an occurrence of a vehicular event and perform subrogation in accordance with one or more rules;

detecting, by the one or more processors and using the intelligent agent, an occurrence of the vehicular event;

in response to the detecting the occurrence of the vehicular event, establishing, by the one or more processors and using the intelligent agent, a mesh network of devices positioned within an environment surrounding the vehicular event, wherein the mesh network of devices includes a first camera monitoring traffic in the environment and a second camera on an autonomous vehicle involved in the vehicular event;

determining, by the one or more processors, traffic congestion at a time of the vehicular event by integrating data from a Global Positioning System receiver in the autonomous vehicle with a recurrent neural network;

forecasting, by the one or more processors, a severity of the vehicular event based on the traffic congestion;

using digital images from the first camera, determining, by the one or more processors, a geolocation of the vehicular event and weather conditions in the environment;

determining, by the one or more processors, impact energy associated with the vehicular event by using visual features of data from the second camera, the visual features being detected by an artificial intelligence system using a scale-invariant feature transform algorithm;

validating, by the one or more processors, an accuracy of a testimony of a witness associated with the vehicular event by classifying the testimony by using a semi-supervised additive noise autoencoder model for deception detection, using the digital images from the first camera, and using the data from the second camera;

generating, by the one or more processors, a confidence score indicating a likelihood of a party favoring a settlement decision associated with the vehicular event, the confidence score being based on historical traffic violations and historical accidents;

collecting, by the one or more processors and using the intelligent agent and the mesh network, property data, event data, and environmental data associated with the vehicular event, wherein the property data includes descriptions of one or more vehicles involved in the vehicular event and descriptions of one or more operators of the one or more vehicles, wherein the event data includes information about events and observations associated with the vehicular event, and wherein the environmental data describes conditions in an area surrounding the vehicular event, the conditions being external to the one or more vehicles involved in the vehicular event;

storing, by the one or more processors and using the intelligent agent, the property, event, and environmental data in a blockchain node and establishing a smart contract on the blockchain node, the smart contract providing authorized parties associated with the vehicular event with an access to the stored property, event, and environmental data;

based on (i) the stored property, event, and environmental data and (ii) the one or more rules, performing, by the one or more processors and using the intelligent agent, a preemptive subrogation by determining a cause of the vehicular event; and based on the severity and geolocation of the vehicular event, the weather conditions of the environment surrounding the vehicular event, the impact energy associated with the vehicular event, the validated accuracy of the testimony, and the confidence score, triggering, by the one or more processors, a generation of a settlement for an insurance claim for the vehicular event and transferring, by the one or more processors, the settlement from the blockchain node to one or more computer systems of one or more entities who are tasked with fulfilling the settlement for the insurance claim for the vehicular event.

14. The method of claim 13, further comprising performing, by the one or more processors and using the intelligent agent, heuristic subrogation by determining one or more local insurance regulations that apply to the vehicular event, comparing data items among the stored property, event, and environmental data, assessing a fault of the vehicular event, assessing one or more conflicting rules associated with the one or more motorized vehicles involved in the vehicular event, and rendering a decision about the fault of the vehicular event and an explanation about how the decision was determined.

15. The method of claim 14, wherein the transferring the settlement is based on the decision about the fault of the vehicular event, one or more regulations, and one or more business policies.

16. The method of claim 14, further comprising:
identifying, by the one or more processors, a dispute about the decision about the fault of the vehicular event;
in response to the identifying the dispute, generating, by the one or more processors, a recommendation for an issuance of one or more subpoenas for a collection of data from a motorized vehicle in proximity to a location of the vehicular event;
in response to the issuance of the one or more subpoenas, securely collecting, by the one or more processors, the data from the motorized vehicle in proximity to the location of the vehicular event; and
based on the data collected from the motorized vehicle in proximity to the location of the vehicular event, rendering, by the one or more processors, a new decision that resolves the dispute.

17. The method of claim 14, further comprising employing, by the one or more processors, an unbiased preemptive subrogation agent, wherein the performing the heuristic subrogation is included in the employing the unbiased preemptive subrogation agent.

18. The method of claim 13, wherein the performing the preemptive subrogation is performed prior to a receipt of a first notice of loss for the vehicular event.

19. The method of claim 13, wherein the mesh network includes a network selected from the group consisting of a wireless network, an ad hoc network, a peer-to-peer network, a video monitoring network, a coaxial network, and a cloud network.

20. The method of claim 13, further comprising:
providing at least one support service for at least one of creating, integrating, hosting, maintaining, and deploying computer readable program code in the computer, the program code being executed by a processor of the computer to implement the activating the intelligent agent, the detecting the occurrence of the vehicular event, the establishing the mesh network, the determining the traffic congestion, the forecasting the severity of the vehicular event, the determining the geolocation of the vehicular event and the weather conditions, the determining the impact energy, the validating the accuracy of the testimony of the witness, the generating the confidence score, the collecting the property, event, and environmental data from the mesh network, the storing the property, event, environmental data in the blockchain node, and the performing the preemptive subrogation, the triggering the generation of the settlement for the insurance claim, and the transferring the settlement from the blockchain node.

* * * * *